United States Patent
Takano (10) Patent No.: US 10,906,440 B2
(45) Date of Patent: Feb. 2, 2021

(54) VEHICLE SEAT

(71) Applicant: Tachi-S Co., Ltd., Tokyo (JP)

(72) Inventor: Jun Takano, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 16/414,045

(22) Filed: May 16, 2019

(65) Prior Publication Data

US 2020/0023759 A1    Jan. 23, 2020

(30) Foreign Application Priority Data

Jul. 18, 2018   (JP) .................................. 2018-135323

(51) Int. Cl.
| | | |
|---|---|---|
| *A47C 7/46* | (2006.01) | |
| *B60N 2/70* | (2006.01) | |
| *B60N 2/30* | (2006.01) | |
| *B60N 2/68* | (2006.01) | |

(52) U.S. Cl.
CPC ......... *B60N 2/7047* (2013.01); *B60N 2/3047* (2013.01); *B60N 2/68* (2013.01)

(58) Field of Classification Search
CPC ................ A47C 1/032; A47C 1/03272; A47C 1/032883; B60N 2/305
See application file for complete search history.

(56) References Cited

U.S. PATENT DOCUMENTS

| | | | | |
|---|---|---|---|---|
| 3,000,668 | A * | 9/1961 | Croy ................. | A47C 1/03272 297/320 |
| 8,480,152 | B2 * | 7/2013 | Shimizu ............... | B60N 2/3011 296/65.09 |
| 2007/0001491 | A1 * | 1/2007 | Marotta ................. | B60N 2/505 297/216.1 |
| 2007/0013217 | A1 * | 1/2007 | Fujita .................. | B60N 2/42736 297/284.4 |
| 2008/0079296 | A1 * | 4/2008 | Endo ...................... | B60N 2/002 297/217.2 |
| 2008/0296946 | A1 * | 12/2008 | Reynolds ............... | B60N 2/525 297/284.6 |
| 2009/0015050 | A1 * | 1/2009 | Dehli ....................... | A47C 7/30 297/340 |
| 2010/0096894 | A1 * | 4/2010 | Fukai ................. | A47C 1/03283 297/300.5 |
| 2011/0080029 | A1 * | 4/2011 | Shimizu ............... | B60N 2/3079 297/334 |

FOREIGN PATENT DOCUMENTS

JP    2012-170621 A    9/2012

* cited by examiner

*Primary Examiner* — Shin H Kim
(74) *Attorney, Agent, or Firm* — Morgan, Lewis & Bockius LLP (57) ABSTRACT

A vehicle seat includes: a seating part that constitutes the vehicle seat; a support member that rotatably supports a portion of the seating part; an elastic member having a first end and a second end, the first end being attached to a movable portion of the seating part which is capable of rotating about the support member and the second end being attached to the seat frame; and an attenuation device that attenuates a motion of the movable portion when the movable portion moves from a seated state with a load applied, back to a normal state in which the applied load is removed. The movable portion of the seating part may include a base member, a slab member provided on the base member, and a surface member that covers the slab member.

9 Claims, 9 Drawing Sheets

VEHICLE SEAT

CROSS-REFERENCES TO RELATED APPLICATIONS

This application relates to and claims priority from Japanese Patent Application No. JP 2018-135323, filed on Jul. 18, 2018, the entire disclosure of which is incorporated herein by reference.

BACKGROUND

Field

The present invention relates to a vehicle seat.

Description of Related Art

A seat cushion structure (or a seat structure) comprising a pad and a skin that covers the front surface side of the pad is known as a typical example of a structure used for a vehicle seat. In an example of this type of seat cushion structure, urethane foam is used for the pad and an air-permeable sheet member is used as the skin.

In a pad made of urethane foam, the urethane foam may hydrolyze upon absorption of water and this can lead to reduced elasticity of the pad and deterioration in terms of seating comfort. As a possible solution to this problem, a seat cushion structure has been developed in which the pad is formed of a three-dimensional mesh-like member or a net-like member made of a thermoplastic resin material having water-draining properties, and the skin is formed of an air-permeable sheet member (see, for example, JP2012-170621 A).

However, the above-described seat cushion structure, which uses a three-dimensional mesh-like member or a net-like member in place of urethane foam, is unable to fully reproduce the characteristics of the original urethane seat. A urethane seat has characteristics such that deflection (X) under load (F) changes less as the load (F) increases. To put it another way, as the urethane seat collapses with an increase of pressure, the degree of deformation of the seat decreases (this can be described as characteristics during loading, i.e., the characteristics when a passenger sits on the seat). Meanwhile, when the urethane seat is unloaded, it returns to its original shape with a delay for the unloading, so that the load-deflection curve during unloading does not trace back along the load-deflection curve during loading (this can be described as characteristics during unloading, i.e., the characteristics when the passenger rises from the seat to, for example, get out of the vehicle). The above-mentioned alternative structure can be assessed as foregoing such characteristics of the urethane seat in exchange for obtaining water-draining properties.

SUMMARY

Under the above circumstances, an object of the present invention is to provide a vehicle seat having a structure that attains similar characteristics to those of conventional urethane seats.

According to an aspect of the invention, a vehicle seat having a vehicle seat frame is provided, the vehicle seat comprising: a seating part that constitutes the vehicle seat; a support member that rotatably supports a portion of the seating part; an elastic member having a first end and a second end, the first end being attached to a movable portion of the seating part that is capable of rotating about the support member and the second end being attached to the seat frame; and an attenuation device that attenuates a motion of the movable portion when the movable portion moves from a seated state with a load applied, back to a normal state in which the applied load is removed.

The vehicle seat according to the above aspect is able to achieve similar characteristics to those obtained by urethane seats by means of the mechanical structure of the seat.

In the vehicle seat according to the above aspect, the movable portion of the seating part may include a base member, a slab member provided on the base member, and a surface member that covers the slab member.

In the vehicle seat according to the above aspect, the base member may be made of a resin material.

In the vehicle seat according to the above aspect, the base member may be located under the slab member except for a front portion of the slab member.

In the vehicle seat according to the above aspect, a bank portion may be provided at both sides of the movable portion so as to be higher than a surface layer of the movable portion.

Such bank portion in the vehicle seat according to the above aspect may be a structure including a fixed frame.

In the vehicle seat according to the above aspect, the movable portion of the seating part and the support member may be located and arranged so as to allow the movable portion to move in a vertical direction.

In the vehicle seat according to the above aspect, the elastic member may employ a structure that exhibits elasticity which changes in a non-linear manner relative to a displacement of the movable portion.

In the vehicle seat according to the above aspect, the elastic member may be structured so as to be placed in a different orientation according to a movement of the movable portion so that a force applied to the elastic member changes in a non-linear manner.

DETAILED DESCRIPTION

Hereinafter, a vehicle seat according to an embodiment of the present invention will be specifically described, with reference to the attached drawings.

Figure 1:
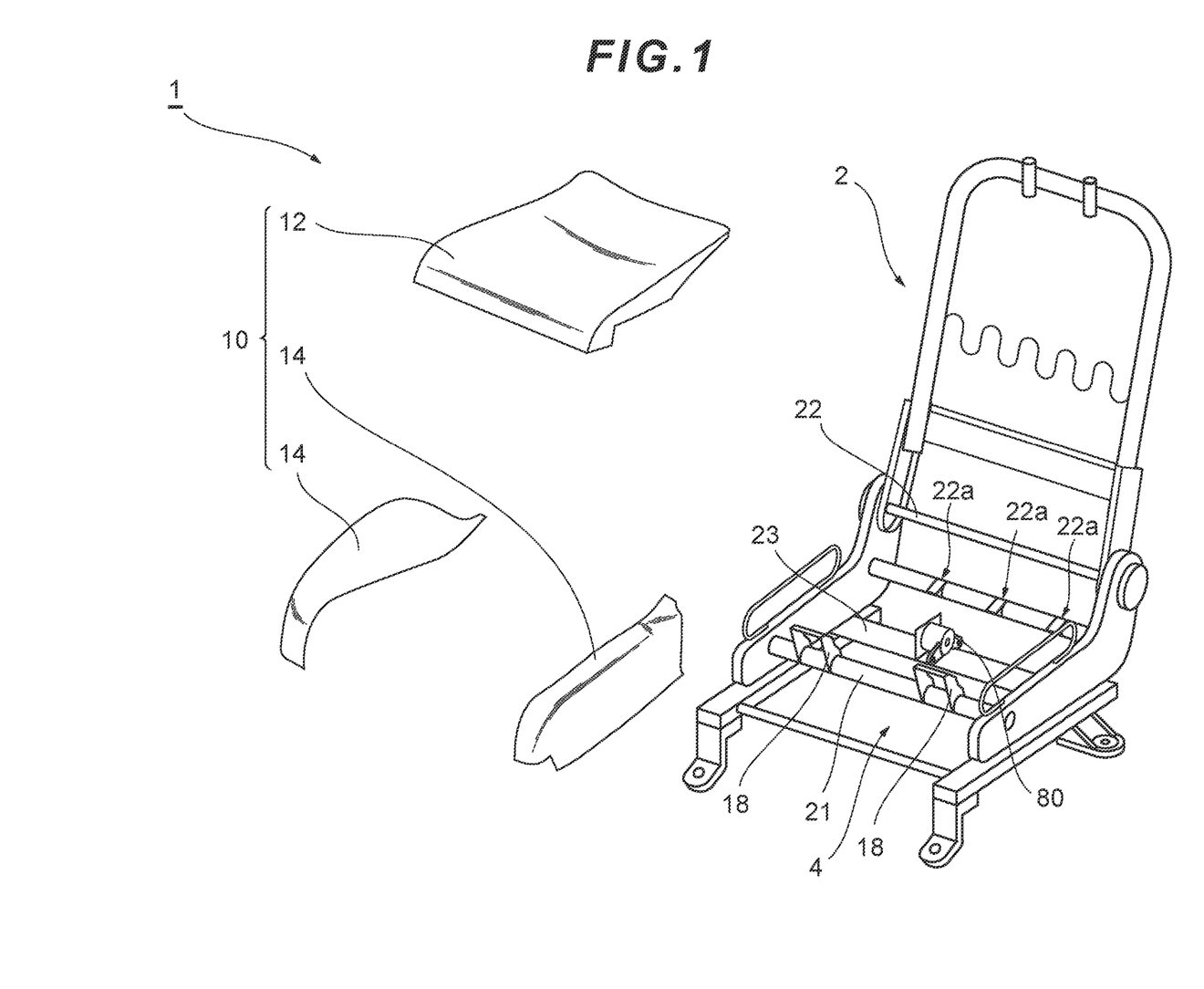
FIG. 1 is an exploded perspective view of a vehicle seat according to an embodiment of the invention, illustrating the major portion of the seat.
Figure 2:
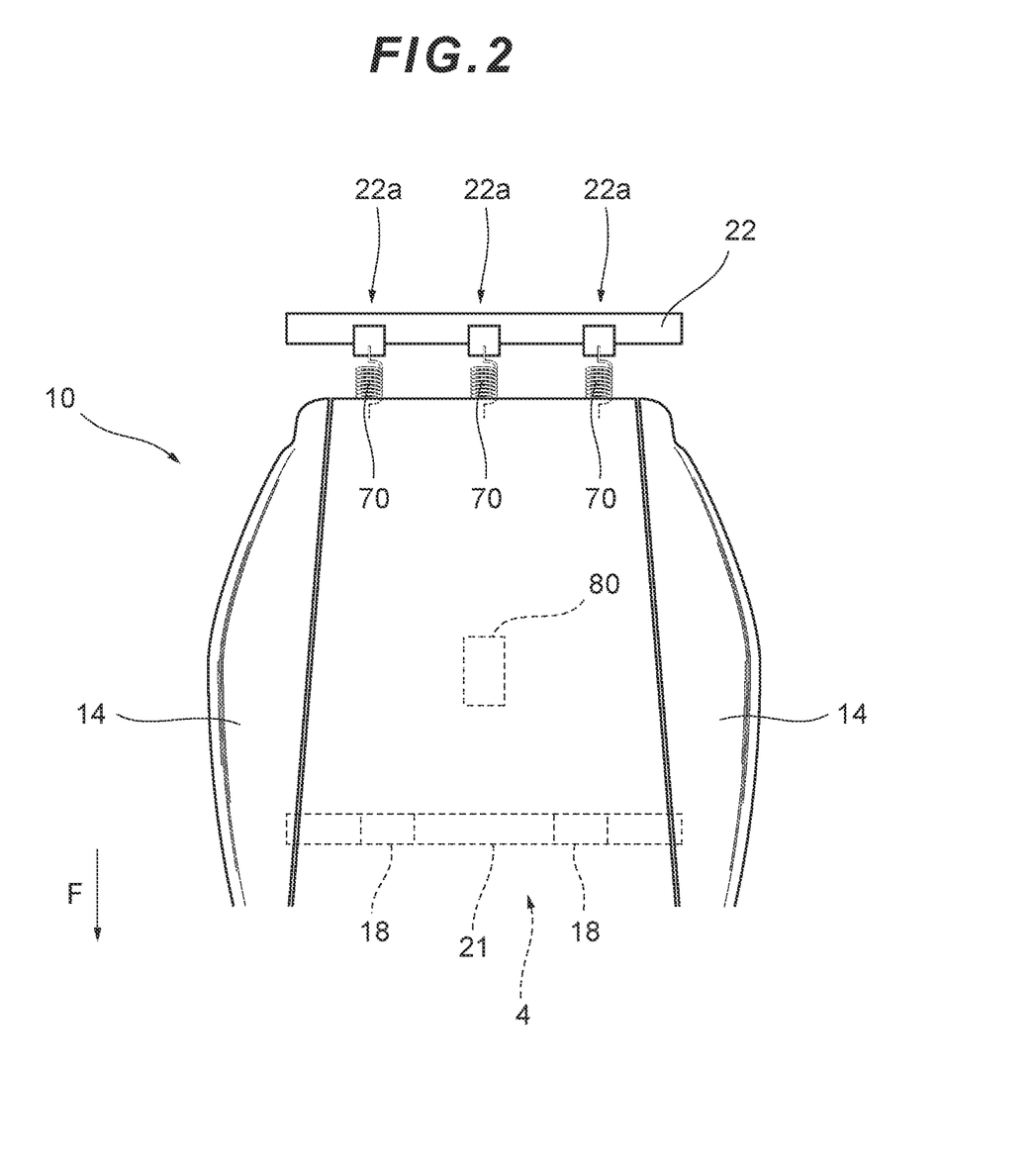
FIG. 2 is a plan view of a seat cushion (seating part) and its periphery of a vehicle seat, and schematically illustrates the structure thereof.

A vehicle seat 1 according to this embodiment includes, for example, a seat frame 2, a seat cushion 10 and a seat back (not shown) which are provided on the seat frame 2, a support member 4, a coil spring 70, and a rotary damper 80 (see FIG. 1, etc.). The reference sign F in FIG. 2, etc., indicates a direction in which the vehicle moves forward.

Figure 3:
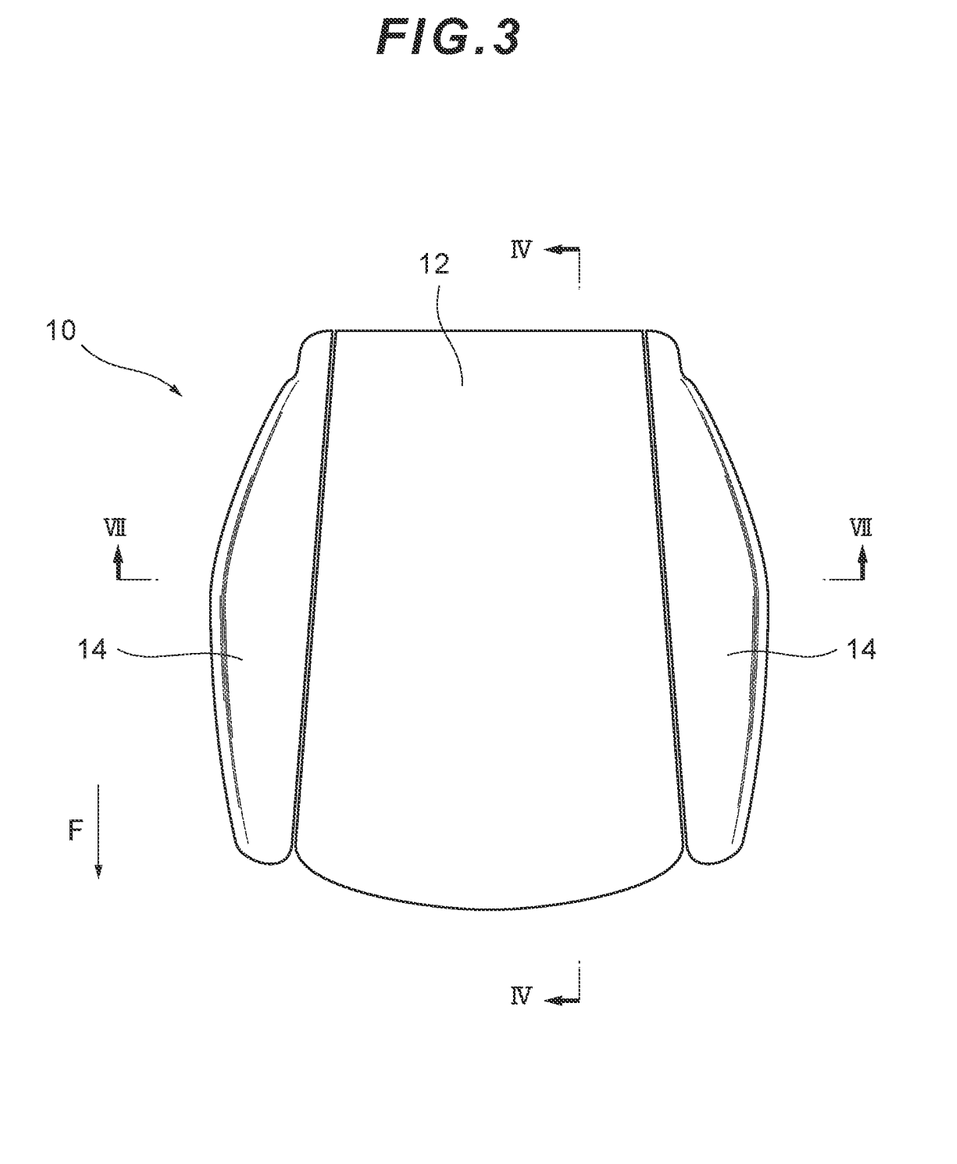
FIG. 3 is a plan view of a seat cushion (seating part).

The seat cushion 10 constitutes a seating part of the vehicle seat 1. In this embodiment, the seat cushion 10 is composed of three divided portions—a main portion 12 at the center and two bank portions 14 located at both sides of the main portion 12 (see FIG. 3, etc.).

The main portion 12 forms a seating surface at the center of the seat cushion 10. In this embodiment, the main portion 12 includes a base member 121, a slab member 122, and a surface member (skin member) 123.

The base member 121 may be, for example, a plate-like resin member. In this embodiment, the base member 121 is sufficiently flexible to allow the center part thereof to moderately bend downward relative to the side portions thereof with a load applied when a passenger sits on the seat (see FIG. 8). For example, the amount of deflection and reaction force under a load applied and the action of returning to the original form upon removal of the load can be adjusted by, for example, changing the properties of the resin used for the base member 121, the thickness of the plate, the presence/absence of a cutout, or the position or shape of such cutout. Although not specifically shown in the drawings, the upper surface of the base member 121 is shaped so as to have a shallow, smooth dent that fits with the hip of a person who sits on the seat. The slab member 122 is provided on the base member 121 (see FIG. 7, etc.). The material used for the slab member 122, the properties of the slab member 122, etc., are not particularly limited. By way of example, the slab member 122 may be made using a fabric member made of PP, PET, etc., so as to have a thickness of, for example, about 5-20 mm (the thickness may be changed according to the specifications) with a soft texture on its surface. The slab member 122 is covered with the surface member 123, such as a seat cover (see FIG. 7, etc.).

Figure 7:
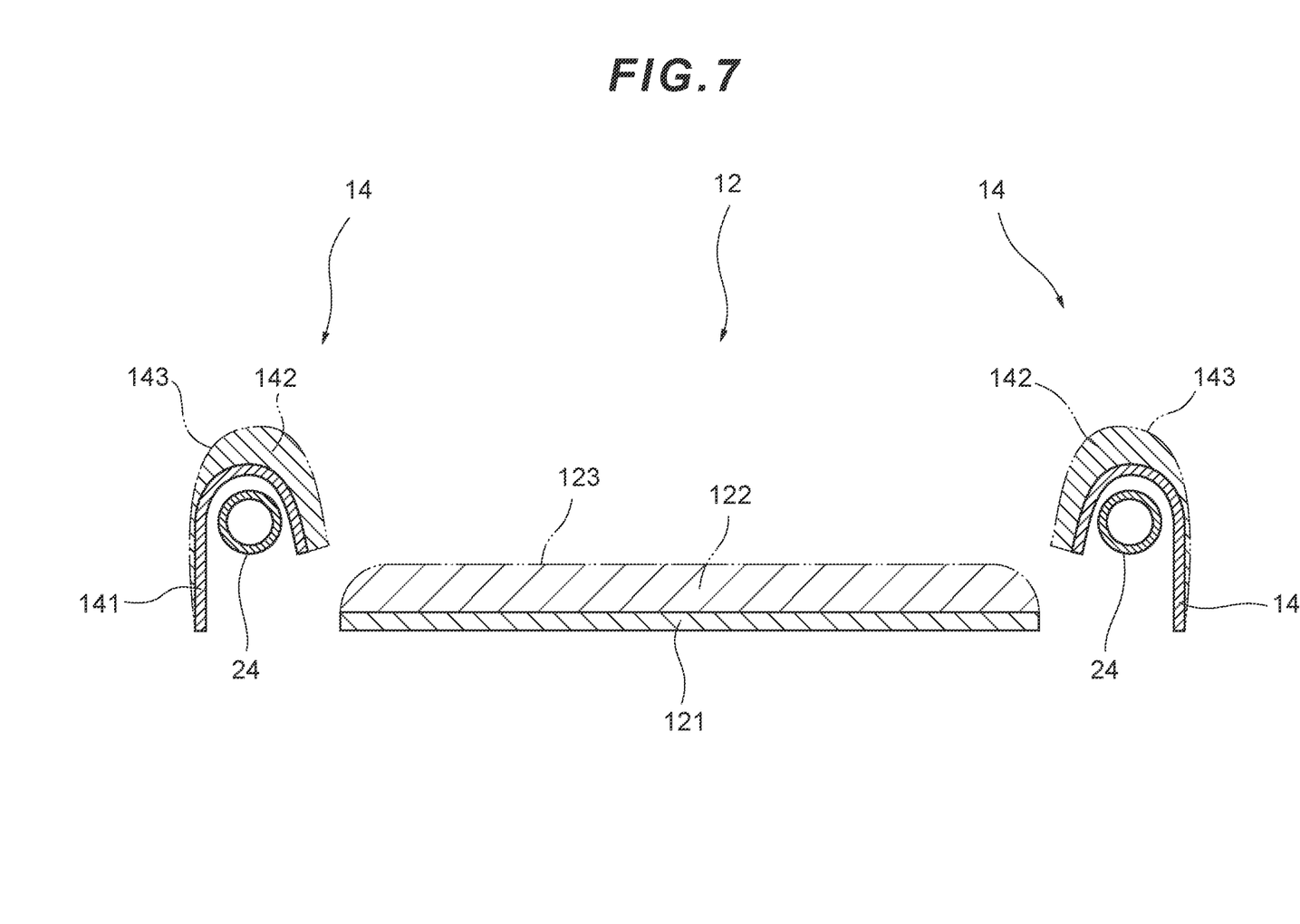
FIG. 7 schematically illustrates the structure of the seat cushion shown in FIG. 3 when cut along the line VII-VII.
Figure 8:
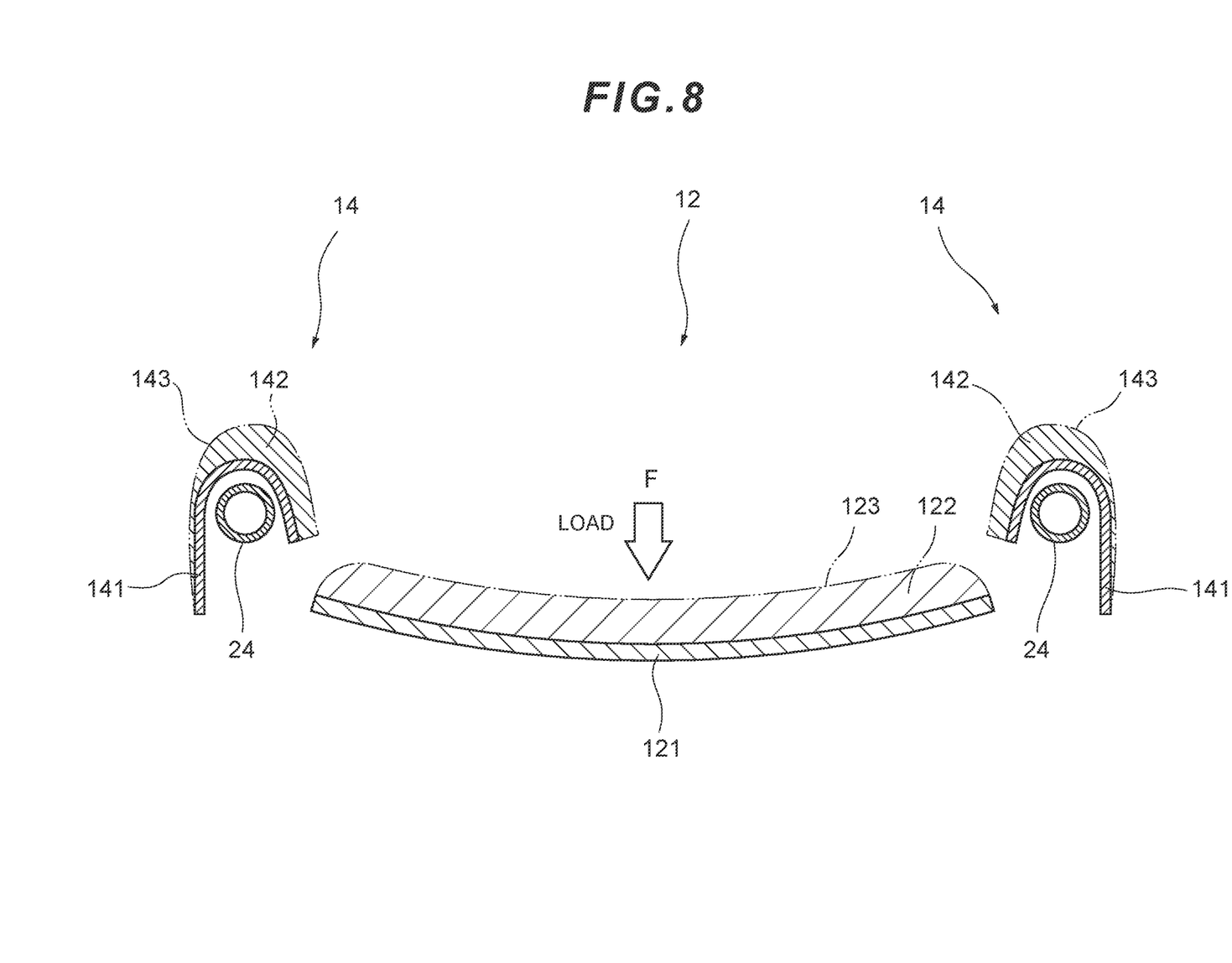
FIG. 8 illustrates the seat cushion shown in FIG. 7 when a load is applied to a movable portion of the seat cushion.

The bank portions 14 of the seat cushion 10 are provided so as to be higher than the surface layer of the main portion 12 (see FIG. 7). The bank portions 14 are each formed by providing a resin member 141, a slab member 142 and a surface member 143 on a side fixation frame 24 provided on each side of the seat frame 2. Unlike the main portion 12, the bank portions 14 having the above configuration do not move. The bank portions 14 support the respective sides of the thighs of the seated person to achieve increased holding property.

The support member 4 rotatably supports the seat cushion 10 in part or in whole. In this embodiment, a pair of right and left front hinge brackets 18 is provided at the bottom of the main portion 12 of the seat cushion 10, and each of the front hinge brackets 18 is coupled to a beam 21 located at the front side of the seat frame 2 with a pin. A hinge is formed by way of such hinge brackets coupled to the beam 21 (see FIGS. 1 and 2, etc.). The support member 4 having the above configuration allows the main portion 12 to be a portion (movable portion) capable of rotating about the beam 21 of the seat frame 2 (see FIG. 5, etc.; in FIG. 5, the lower abdomen and the thigh of the seated person are schematically illustrated with the line H and the base of the thigh (around the hip joint) is shown with the line H1, while only the thigh of the seated person is schematically illustrated with the line H in FIG. 6).

Figure 4:
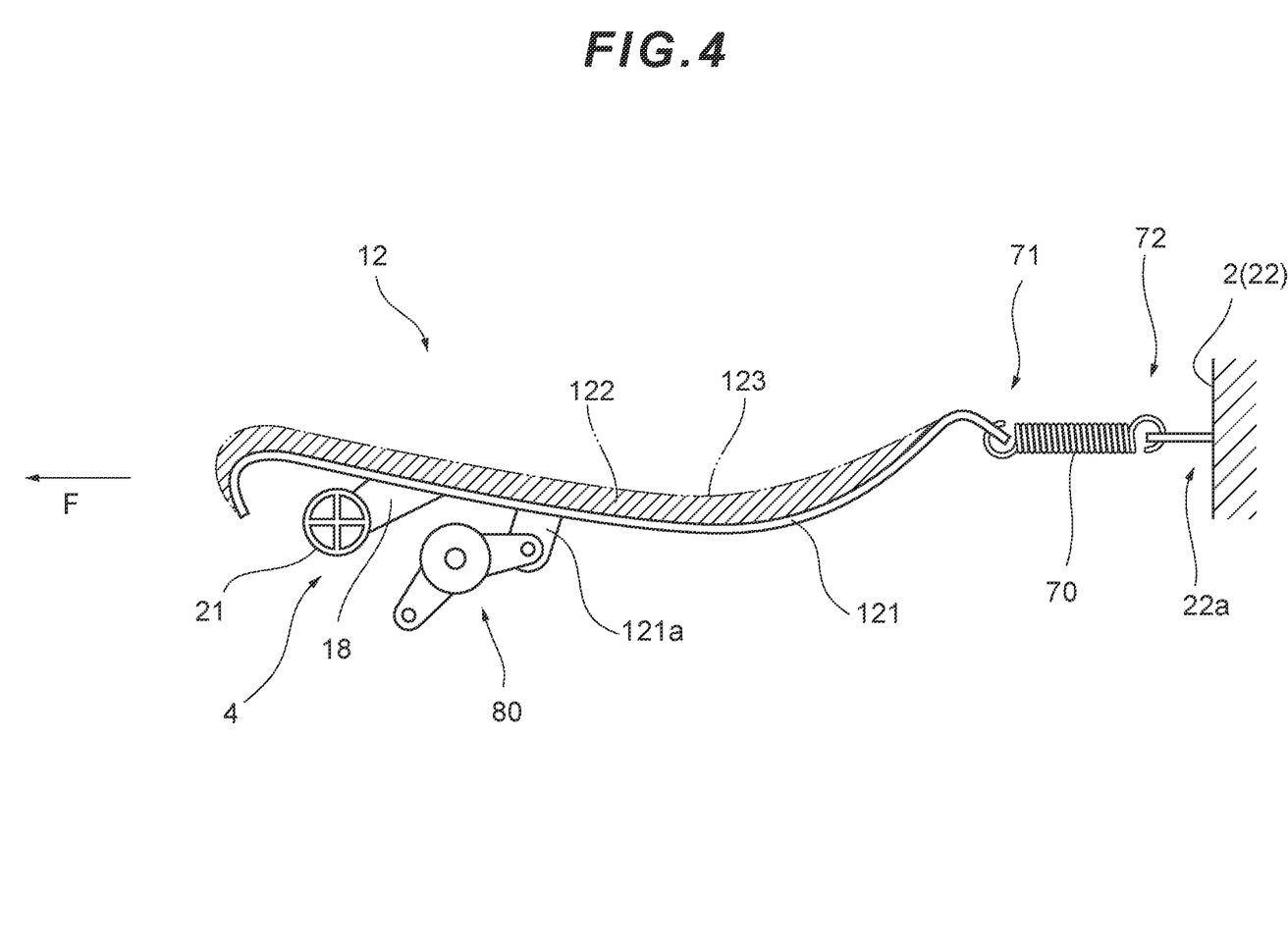
FIG. 4 schematically illustrates the structure of the seat cushion (seating part) and its periphery shown in FIG. 3 when cut along the line IV-IV.

The coil spring 70 is provided as an elastic member for supporting the main portion (movable portion) 12 of the seat cushion 10. In this embodiment, one end of the coil spring 70 is attached to the rear edge of the base member 121 and the other end is attached to a spring attachment part 22a of a rear beam 22 in the seat frame 2 (see FIG. 4, etc.). In this embodiment, three coil springs 70 are provided at the center, right and left in the width direction of the vehicle seat 1 (see FIG. 2, etc.). The number of the coil springs 70 provided and the locations thereof may be modified as appropriate.

The coil spring 70 may be configured so that its orientation changes according to the movement of the main portion 12. The coil springs 70 in this embodiment are each rotatable relative to the beam 22. Specifically, each coil spring 70 is positioned in a horizontal or almost horizontal position in a normal state where no person sits on the seat (see FIG. 4) and the coil spring 70 is configured so as to head downward as a load to the main portion 12 increases and an amount of downward displacement of the main portion 12 increases (see FIG. 5). With this configuration, as the amount of downward displacement of the main portion 12 increases, the extension/contraction vector of the coil spring 70 becomes approximate to the vector in which the load is applied. In other words, a force applied to each coil spring 70 changes in a non-linear manner as the coil spring 70 changes its orientation according to the movement of the main portion 12.

Figure 5:
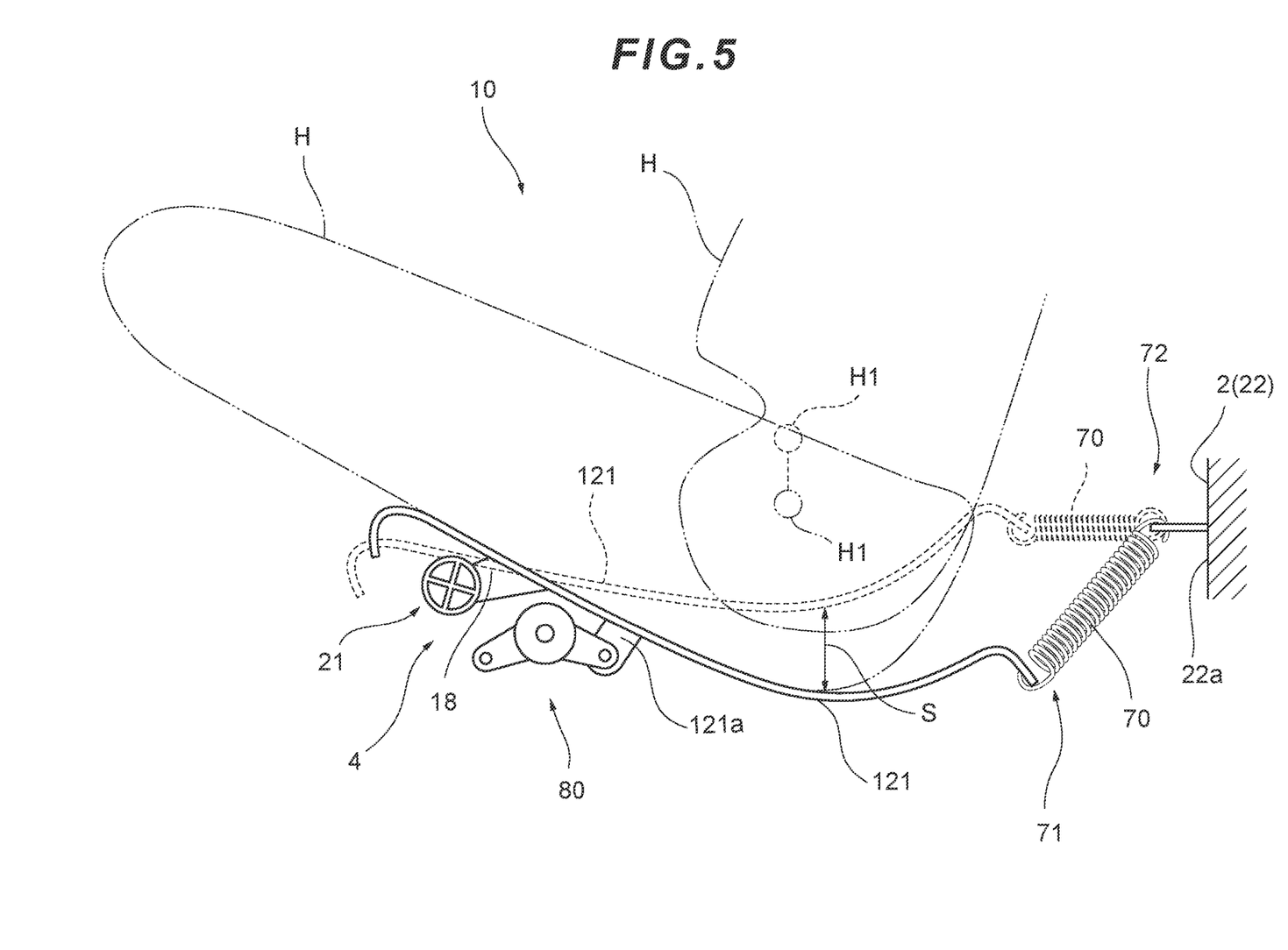
FIG. 5 is a side view of a vehicle seat for explaining the movement of a front portion of the seat cushion, etc., when a passenger sits on the vehicle seat.
Figure 6:
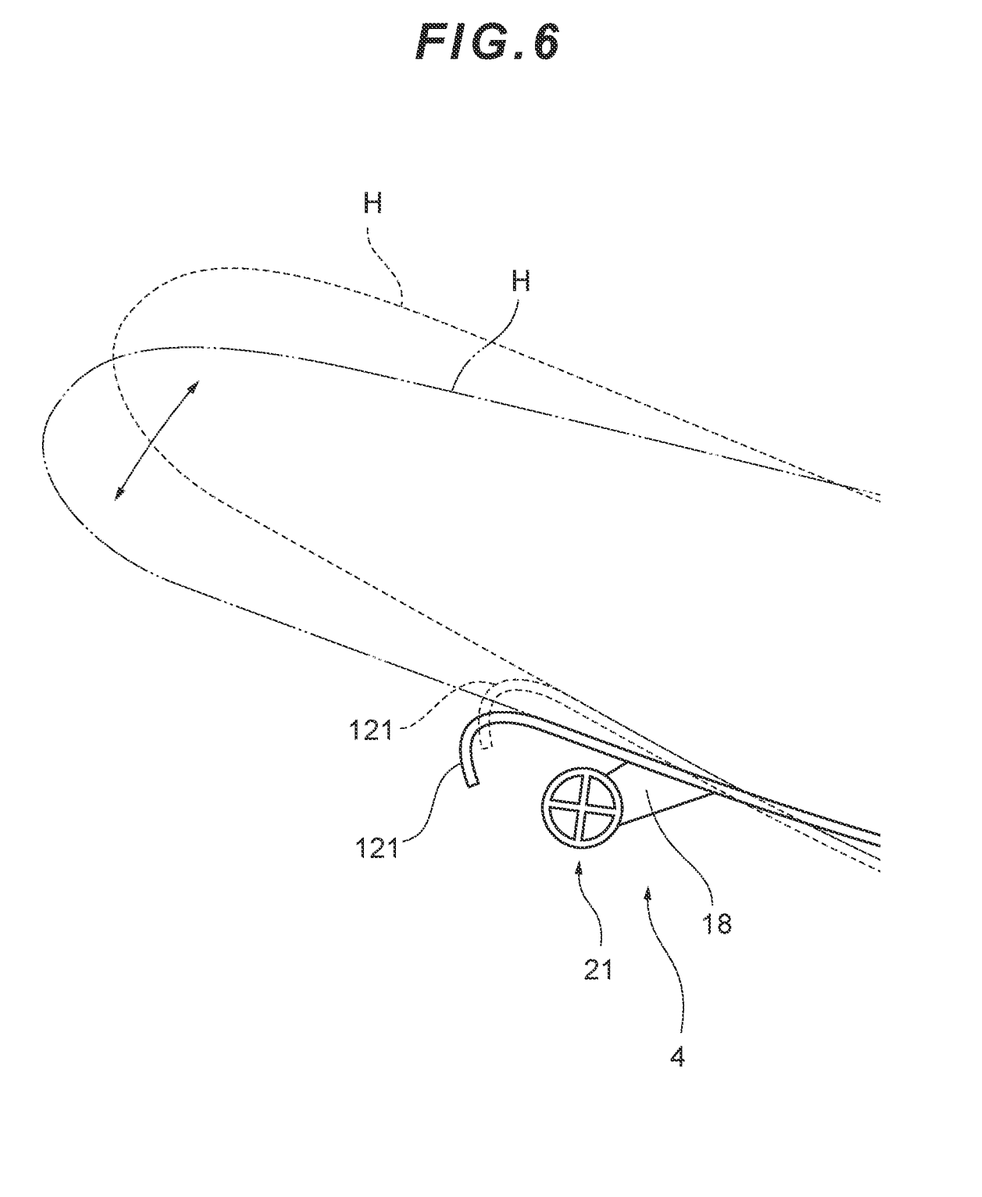
FIG. 6 is an enlarged view of the portion indicated with the sign VI in FIG. 5, for explaining the movement of the front portion of the seat cushion when a driver puts his/her foot on a pedal to operate the vehicle.

When a passenger sits on the seat (i.e., in a seated state), the main portion 12 of the seat cushion 10, which is partly supported by the coil springs 70 as described above, moves around the support member 4 to sink down while being hung on the coil springs 70. When the passenger gets out of the seat (i.e., in a normal state), the main portion 12 returns to the original position (i.e., the position when no passenger sits on the seat) due to the elasticity of the coil springs 70 (see FIGS. 4 and 5). The reference sign S in FIG. 5 shows the upward and downward displacement (stroke) at a particular position of the main portion 12. In the described structure, the main portion 12 and the support member 4 may be configured and arranged so that the main portion 12 will be displaced upward and downward in the vertical or almost vertical direction. With this arrangement, the displacement of the main portion 12 when seated describes a substantially vertical trajectory, leading to the achievement of a structure exhibiting characteristics and movements closer to those of conventional urethane foam seats.

The rotary damper 80 is provided as an illustrative example of a device for attenuating the motion of the main portion 12 when it moves from a seated state with a load applied, back to a normal state in which the applied load is removed. In this embodiment, the rotary damper 80 is provided at a position near the center of, and below the main portion 12, and the rotary damper 80 is attached to a beam 23 that is provided near the center of the seat frame 2 (see FIGS. 1 and 2). A movable piece of the rotary damper 80 is coupled to a projecting piece 121a of the base member 121 with a pin (see FIGS. 4 and 5). In the present embodiment, the rotary damper 80 employs a one-way system which attenuates the motion of the main portion 12 only when the main portion 12 returns from a load-applied, seated state to a normal state where the applied load is removed, without exerting attenuation effects when the main portion 12 moves in an inverse manner. It should be noted, however, that such one-way damper is only one of the suitable examples of the damper.

Furthermore, in the vehicle seat 1 of the present embodiment, the base member 121 of the main portion 12 has a size such that the base member 121 is located under the slab member 122 except for the front portion of the slab member 122. In other words, the base member 121 is not present below the front portion of the slab member 122 (see FIG. 5). With this configuration of the vehicle seat 1, when the front portion of the slab member 122 bends downward, such bending action is rarely interfered with by the base member 121. Accordingly, when a driver who sits on this vehicle seat 1 steps on the pedal, the front portion of the slab member 122 easily bends downward so that an easy pedal-pressing action is ensured. Alternatively, the base member 121 may have sufficient flexibility and thinness so as not to interfere with the front portion of the slab member 122 when it bends downward. This alternative configuration also ensures an easy pedal-pressing action by the driver (see FIG. 6).

The characteristics of the vehicle seat 1 having the above-described structure (for example, how the vehicle seat 1 deforms), will now be described (see FIGS. 9 and 10).

Figure 9:
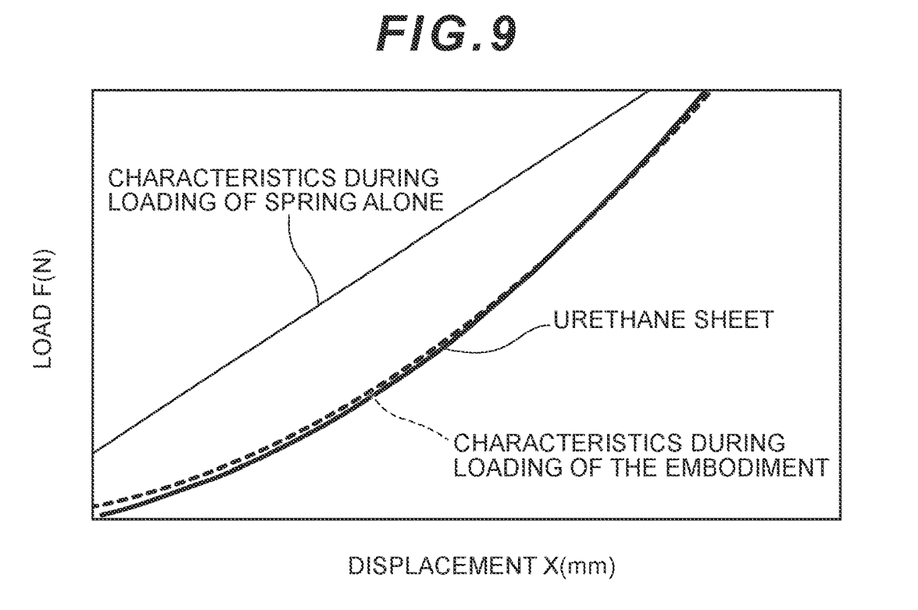
FIG. 9 is a graph showing respective load-deflection curves during loading of a spring alone and of a vehicle seat according to the present invention.
Figure 10:
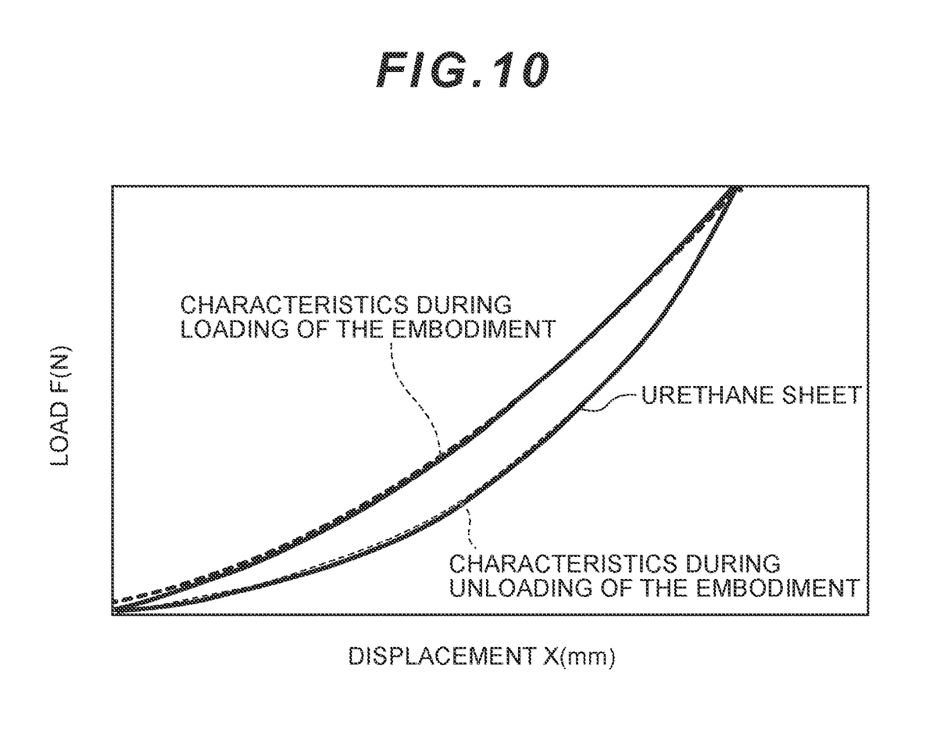
FIG. 10 is a graph showing respective load-deflection curves during unloading of a spring alone and of a vehicle seat according to the present invention.

A supporting structure simply using a spring alone which is placed in a fixed orientation shows a load-displacement curve with a linear profile (see the "characteristics during loading of spring alone" in FIG. 9). Meanwhile, the vehicle seat 1 of the present embodiment is configured such that the extension/contraction vector of the coil springs 70 becomes approximate to the vector of load applied as the amount of downward displacement of the main portion 12 increases (see FIGS. 4 and 5), and this provides characteristics, during loading, such that an amount of displacement of the main portion 12 decreases with an increase of load (see FIG. 9). Such characteristics during loading are similar to the characteristics obtained during loading of conventional urethane seats. In other words, characteristics similar to those of urethane seats are achieved by way of a mechanical structure.

The movement when the passenger gets out of the seat (i.e., when the seat is unloaded) will be described as follows. When the seat is supported by a structure simply using a spring alone, the same load-displacement curve is obtained in both the loading and unloading phases. In contrast, in the vehicle seat 1 of the present embodiment, which has the rotary damper (attenuation device) 80, the load-displacement curve in the unloading phase will be different from the load-displacement curve obtained in the loading phase, since resistance is applied to the elastic resilience of the coil springs 70 to thereby decrease the amount of load (force) removed from the vehicle seat 1 during unloading (see FIG. 10). In particular, when the seat is unloaded with resistance applied to the elastic resilience of the coil springs 70, an amount of displacement of the seat relative to the amount of load removed from the seat will decrease, and this means that the main portion 12 will less closely follow the motion of the hip of the seated person. Such characteristics of the seat when unloaded are approximate to those of conventional urethane seats. In other words, the present embodiment achieves characteristics similar to those of urethane seats by means of a mechanical structure.

As described above, the vehicle seat 1 provides characteristics during loading and unloading that are approximate to those of the conventional urethane seats through the use of a mechanical structure. Such vehicle seat 1 no longer has the need to use urethane foam as a material, and is therefore free from the problems that can occur when urethane foam is used as a material (e.g., a urethane pad may be subject to hydrolysis when it absorbs water, and the elasticity of the pad can decrease due to the absorption of water, leading to deterioration in terms of seating comfort). Moreover, although a seat using a urethane pad needs to have a sufficiently thick pad, the vehicle seat 1 of the present embodiment does not need such thick pad, and this enables the seat cushion 10 (and the components that constitute the seat cushion 10) to be thinner.

Furthermore, the vehicle seat 1 of the present embodiment is configured such that the top surface of the main portion 12 of the seat cushion 10 is slightly dented so as to have a shallow recess that smoothly fits with the hip of the seated person. In other words, the vehicle seat 1 of the present embodiment has a nature of fitting with the posture of a person that is taken when the person sits on a urethane seat. The vehicle seat 1 also provides moderate resilience against load, as well as appropriate cushioning properties. Furthermore, the vehicle seat 1 distributes load, which is likely to concentrate on the "sitting bones" (tuber ischiadicum) of the seated person, so as to realize a well-balanced body pressure distribution. Moreover, the bank portions 14 of the seat cushion 10 support load and enable the seated person to stably maintain his/her seated position, leading to an improvement in the holding property of the seat.

In addition, the above-described mechanical structure can be implemented by, for example, adding coil springs, etc., to an existing seat frame. In other words, such mechanical structure can be easily applied to existing vehicles.

It should be appreciated that the above-described embodiment is only one of the preferred embodiments of the present invention and that it does not limit the present invention by any means. The present invention can be modified in various ways without departing from the gist of the present invention. For example, the vehicle seat 1 of the present embodiment can be used for seats of various types of vehicles (including not only automobile seats, but also airplane seats, passenger ship seats, and seats for other various vehicles).

Furthermore, the above embodiment describes a structure in which only a portion of the seat cushion 10 (i.e., the main portion 12) is rotatably supported; however, the described structure is merely a preferred example. Obviously, if the seat cushion 10 is not divided into portions, but is formed integrally, the seat cushion 10 may be supported in a manner wherein the entire part of the seat cushion 10 is rotatable. In other words, the structure described in the above embodiment can be employed regardless of whether the seat cushion 10 is movable in part or in whole.

Furthermore, the above embodiment describes a structure using coil springs 70; however, the described structure is merely a preferred example. The main portion 12 may be supported by using an elastic member other than the coil springs 70, such as by using torsion springs.

The present invention is suited for use in a vehicle seat having a seat frame.

The present invention provides a vehicle seat which is structured so as to provide similar characteristics to those of conventional urethane seats.

What is claimed is:
1. A vehicle seat having a seat frame, comprising:
   a seating part that constitutes the vehicle seat;
   a support member that rotatably supports a portion of the seating part;

an elastic member having a first end and a second end, the first end being attached to a movable portion of the seating part that is capable of rotating about the support member and the second end being attached to the seat frame; and an attenuation device that attenuates a motion of the movable portion when the movable portion moves from a seated state with a load applied, back to a normal state in which the applied load is removed, wherein the movable portion of the seating part comprises a base member, a slab member provided on the base member, and a surface member that covers the slab member.

2. The vehicle seat according to claim 1, wherein the base member is made of a resin material.

3. The vehicle seat according to claim 1, wherein the base member is located under the slab member except for a front portion of the slab member.

4. The vehicle seat according to claim 2, wherein the base member is located under the slab member except for a front portion of the slab member.

5. The vehicle seat according to claim 1, wherein the movable portion of the seating part and the support member are located and arranged so as to allow the movable portion to move in a vertical direction.

6. A vehicle seat having a seat frame, comprising:
a seating part that constitutes the vehicle seat;
a support member that rotatably supports a portion of the seating part;
an elastic member having a first end and a second end, the first end being attached to a movable portion of the seating part that is capable of rotating about the support member and the second end being attached to the seat frame; and
an attenuation device that attenuates a motion of the movable portion when the movable portion moves from a seated state with a load applied, back to a normal state in which the applied load is removed,
wherein a bank portion is provided at both sides of the movable portion and the bank portion is higher than a surface layer of the movable portion.

7. The vehicle seat according to claim 6, wherein the bank portion is a structure including a fixed frame.

8. A vehicle seat having a seat frame, comprising:
a seating part that constitutes the vehicle seat;
a support member that rotatably supports a portion of the seating part;
an elastic member having a first end and a second end, the first end being attached to a movable portion of the seating part that is capable of rotating about the support member and the second end being attached to the seat frame; and
an attenuation device that attenuates a motion of the movable portion when the movable portion moves from a seated state with a load applied, back to a normal state in which the applied load is removed,
wherein the elastic member has a structure that exhibits elasticity which changes in a non-linear manner relative to a displacement of the movable portion.

9. The vehicle seat according to claim 8, wherein the elastic member is structured so as to be placed in a different orientation according to a movement of the movable portion so that a force applied to the elastic member changes in a non-linear manner.

* * * * *